(12) United States Patent
Hollen et al.

(10) Patent No.: US 12,188,264 B2
(45) Date of Patent: Jan. 7, 2025

(54) WING LOCK AND DEPLOYMENT MECHANISM

(71) Applicant: The Boeing Company, Chicago, IL (US)

(72) Inventors: Keith Ryan Hollen, Saint Charles, MO (US); Nathan Matthew Knibb, Manchester, MO (US); Perry T. Horst, Tacoma, WA (US); Jonathan David Gettinger, Imperial, MO (US); Alexander McGregor, St. Louis, MO (US); Everett Ryan Eaton, Saint Charles, MO (US); Michael L Oleshchuk, Saint Charles, MO (US); Sean Craig Sundberg, Saint Charles, MO (US); Angel Rodriguez, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 287 days.

(21) Appl. No.: 17/936,079

(22) Filed: Sep. 28, 2022

(65) Prior Publication Data
US 2024/0102320 A1    Mar. 28, 2024

(51) Int. Cl.
| | | |
|---|---|---|
| E05B 65/00 | (2006.01) |
| B64C 3/38 | (2006.01) |
| B64C 3/56 | (2006.01) |
| B64D 5/00 | (2006.01) |
| B64U 20/50 | (2023.01) |
| F42B 10/14 | (2006.01) |

(52) U.S. Cl.
CPC .............. *E05B 65/00* (2013.01); *B64C 3/56* (2013.01); *B64D 5/00* (2013.01); *B64U 20/50* (2023.01); *F42B 10/14* (2013.01); *B64C 3/38* (2013.01)

(58) Field of Classification Search
CPC ............. B64C 3/38; B64C 3/56; B64C 11/28; B64U 20/50; B64D 5/00; E05B 65/00; F42B 10/14
See application file for complete search history.

(56) References Cited

U.S. PATENT DOCUMENTS

| | | | |
|---|---|---|---|
| 3,405,891 A * | 10/1968 | Jacquart | B64C 3/40 |
| | | | 244/46 |
| 6,880,780 B1 * | 4/2005 | Perry | F42B 10/14 |
| | | | 244/49 |
| 7,841,559 B1 | 11/2010 | O'Shea | |
| 10,317,179 B2 | 6/2019 | Lutzenberger | |
| 10,429,158 B2 | 10/2019 | Lutzenberger | |
| 11,255,648 B2 | 2/2022 | O'Shea et al. | |
| 11,952,113 B1 * | 4/2024 | Hollen | B64D 5/00 |

(Continued)

OTHER PUBLICATIONS

Notice of Allowance dated Jan. 24, 2024, regarding U.S. Appl. No. 17/936,091, 13 pages.

*Primary Examiner* — Rodney A Bonnette
(74) *Attorney, Agent, or Firm* — Yee & Associates, P.C.

(57) ABSTRACT

A wing lock and deployment apparatus for an air launched vehicle includes a driver acted on by a single linear actuation event. The disclosed wing lock and deployment apparatus is capable of unlocking deployable wings of an air launched vehicle, deploying deployable wings of the air launched vehicle from a stored position, and locking deployable wings of the air launched vehicle in a deployed position in sequential order with the one single linear actuation event.

20 Claims, 10 Drawing Sheets

(56) References Cited

U.S. PATENT DOCUMENTS

| | | | |
|---|---|---|---|
| 2010/0314490 A1* | 12/2010 | Hong | F42B 10/18 |
| | | | 244/49 |
| 2012/0175460 A1* | 7/2012 | Palani | F42B 10/14 |
| | | | 244/3.28 |
| 2017/0336184 A1* | 11/2017 | Merems | B64U 30/12 |
| 2018/0222569 A1 | 8/2018 | Brakes et al. | |
| 2019/0061911 A1 | 2/2019 | Brakes et al. | |
| 2020/0307762 A1 | 10/2020 | Morrell et al. | |
| 2020/0393223 A1 | 12/2020 | Travis | |

* cited by examiner

WING LOCK AND DEPLOYMENT MECHANISM

BACKGROUND INFORMATION

1. Field

The present disclosure relates generally to air launched vehicles. More specifically, the present disclosure relates to a wing lock and deployment system for storing, unlocking, and deploying wings of an air launched vehicle.

2. Background

Air launched vehicles typically are carried on a host aircraft with deployable wings locked in a stowed position. To maintain safety of flight certifications, the deployable wings must not be unlocked and deployed until the air launched vehicle has separated from the host aircraft. Typically, a locking mechanism that ensures the deployable wings stay locked in the stowed position is independent of a wing deployment mechanism which is also independent of a locking mechanism for the deployable wings once they reach a deployed position. Further, the three separated mechanisms each require a separate command signal which must be accurately timed.

The requirement for three separate mechanisms with their own actuators and mechanism inputs complicates the manufacture and use of air launched vehicles. Many existing solutions require multiple systems to tackle each problem individually. These solutions are complicated and expensive.

Therefore, it would be desirable to have an apparatus and system that takes into account at least some of the issues discussed above, as well as other possible issues.

SUMMARY

An illustrative embodiment of the present disclosure provides a wing lock and deployment apparatus comprising a driver, a linkage, a lock rod, and a shoe clip. The driver is configured to move linearly, driven by a linear motion source. One end of the linkage is pivotally connected to the driver and slidable within a slot in the driver. An opposite end of the linkage is pivotally connected to a deployable wing. The lock rod is engaged with the driver and the shoe clip is mounted to the lock rod. The shoe clip is sized to engage the deployable wing. A bias on the lock rod forces the shoe clip into engagement with the deployable wing to maintain the deployable wing locked in a stored position.

Another illustrative embodiment of the present disclosure provides a wing lock and deployment system for storing, unlocking, and deploying wings of an air launched vehicle comprising a glide kit attached to the air launched vehicle and a linear motion source engaged with the glide kit. The glide kit comprising deployable wings, linkages pivotally attached the deployable wings, a driver, a lock rod, and a shoe clip. The driver is configured to move linearly, driven by a linear motion source. The linkages are further pivotally connected to the driver and slidable within slots in the driver. The lock rod is engaged with the driver and the shoe clip is mounted to the lock rod. The shoe clip is sized to engage the deployable wings when the deployable wings are coupled together in a stored position. A bias on the lock rod forces the shoe clip into engagement with the deployable wings to maintain the deployable wings locked in the stored position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account a typical wing lock and deployment system for an air launched vehicle requires three separate mechanisms and three separate commands from a control system for unlocking deployable wings from a locked condition, deploying the wings from a stored position to a deployed position, and relocking the wings in the deployed position.

The illustrative embodiments recognize and take into account that requiring three separate mechanisms and three separate command signals to unlock, deploy, and relock deployable wings of an air launched vehicle is overly complicated, costly, and requires specific timing of the three separate commands.

Thus, the illustrated embodiments provide a wing lock and deployment apparatus that allows for a single command to unlock deployable wings of an air launched vehicle, deploy the wings to a deployed position, and relock the wings in the deployed position. The illustrated embodiments eliminate the needs for three separate mechanisms with their own actuators and mechanism inputs and instead accomplish all three tasks with one single linear actuation event.

The illustrated embodiments provide a wing lock and deployment apparatus and system which only receives one input and accomplishes all three tasks in order, reliably and inexpensively.

Figure 1:
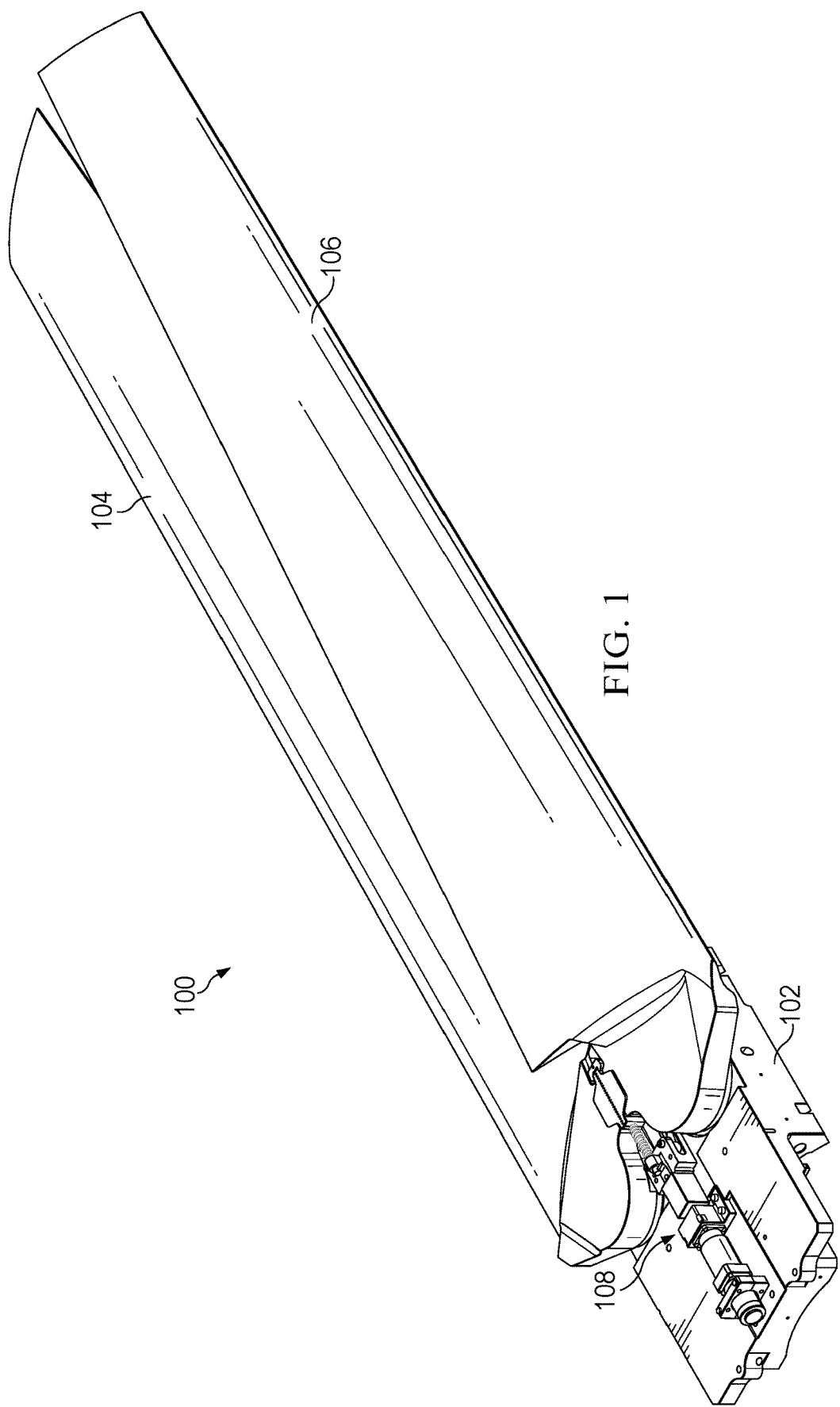
FIG. 1 is an illustration of a glide kit of an air launched vehicle in a stored position in accordance with an illustrative example.

With reference now to the figures and, in particular, with reference to FIG. 1, an illustration of a glide kit of an air launched vehicle is depicted in accordance with an illustrative embodiment. Glide kit 100 has housing 102, deployable wing 104 and deployable wing 106, and wing lock and deployment apparatus 108. Housing 102 acts a base or platform for mounting the components of glide kit 100 thereon. Housing 102 also provides an attachment point of glide kit 100 to structure of an air launched vehicle. The air launched vehicle, complete with attached glide kit 100, may be carried or transported by a host aircraft (not shown) until deployed from the host aircraft.

Figure 3:
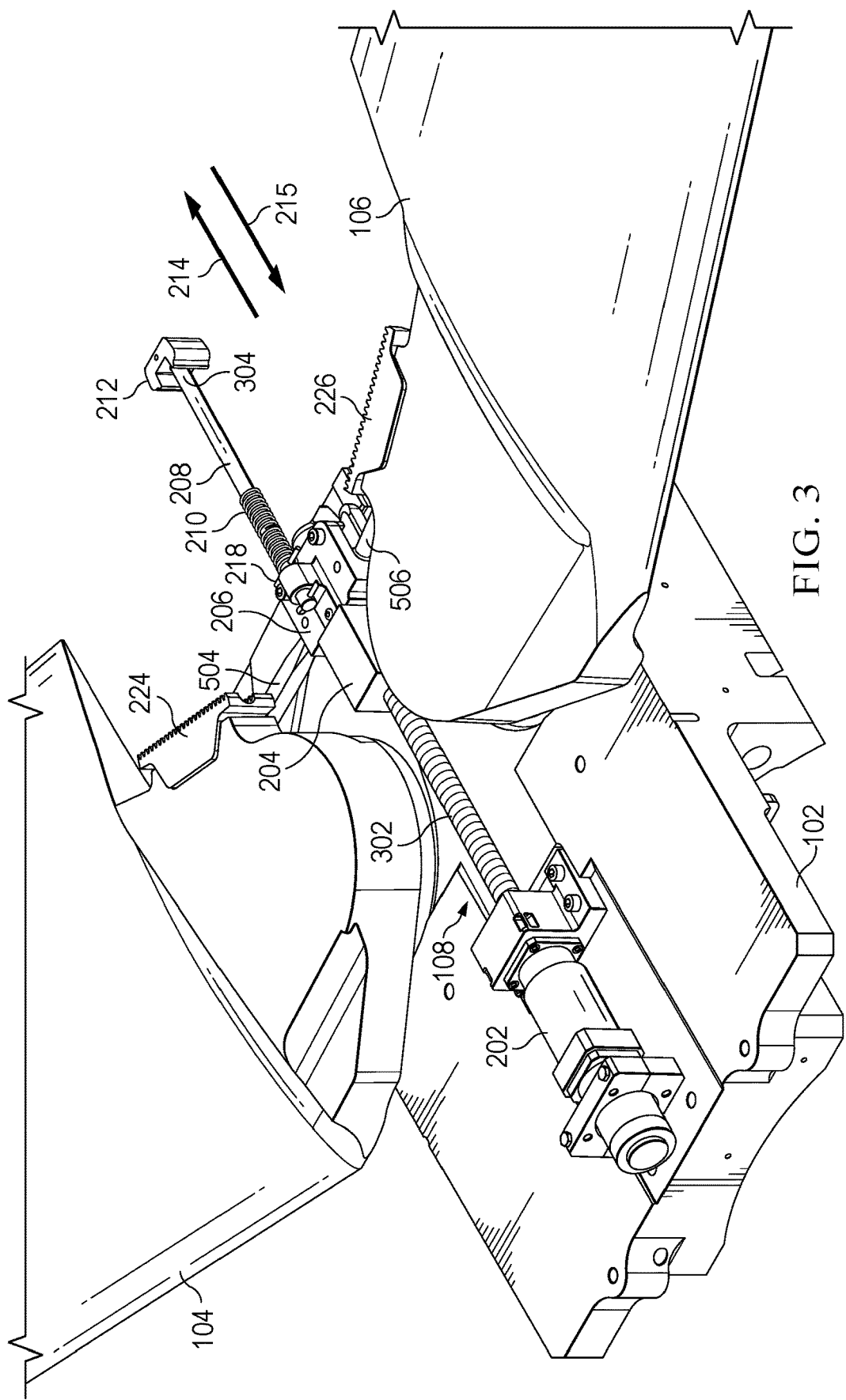
FIG. 3 is an illustration of a glide kit of an air launched vehicle in a deployed position in accordance with an illustrative example.

Deployable wing 104 is pivotally mounted on housing 102. Deployable wing 106 is pivotally mounted on housing 102. Deployable wing 104 and deployable wing 106 are illustrated in a stored position in FIG. 1. Deployable wing 104 and deployable wing 106 may pivot with respect to housing 102 from the stored position (FIG. 1) to a deployed position (FIG. 3). Wing lock and deployment apparatus 108 is mounted to housing 102. In the stored position, while the air launched vehicle is transported by the host aircraft, wing lock and deployment apparatus 108 securely locks deployable wing 104 and deployable wing 106 in the stored position. To maintain safety of flight certifications, the deployable wings must not be unlocked and deployed until the air launched vehicle has separated from the host aircraft.

After launching the air launched vehicle with glide kit 100 attached from the host aircraft, a single command received by wing lock and deployment apparatus 108 initiates a single linear actuation event which causes wing lock and deployment apparatus 108 to sequentially unlock deployable wing 104 and unlock deployable wing 106 from the stored position, deploy deployable wing 104 and deployable wing 106, and lock the deployable wings in the deployed position. Wing lock and deployment apparatus 108 accomplishes the three operations of unlocking, deploying, and locking the deployable wings in a sequential manner with a single command. In other words, deploying the wings occurs after the wings are unlocked and locking the wings in the deployed position occurs after the wings are deployed. A single command received by wing lock and deployment apparatus 108 initiates the three sequentially ordered operations. Wing lock and deployment apparatus 108 is capable of accomplishing the three sequentially ordered operations upon receiving a single command.

Figure 2:
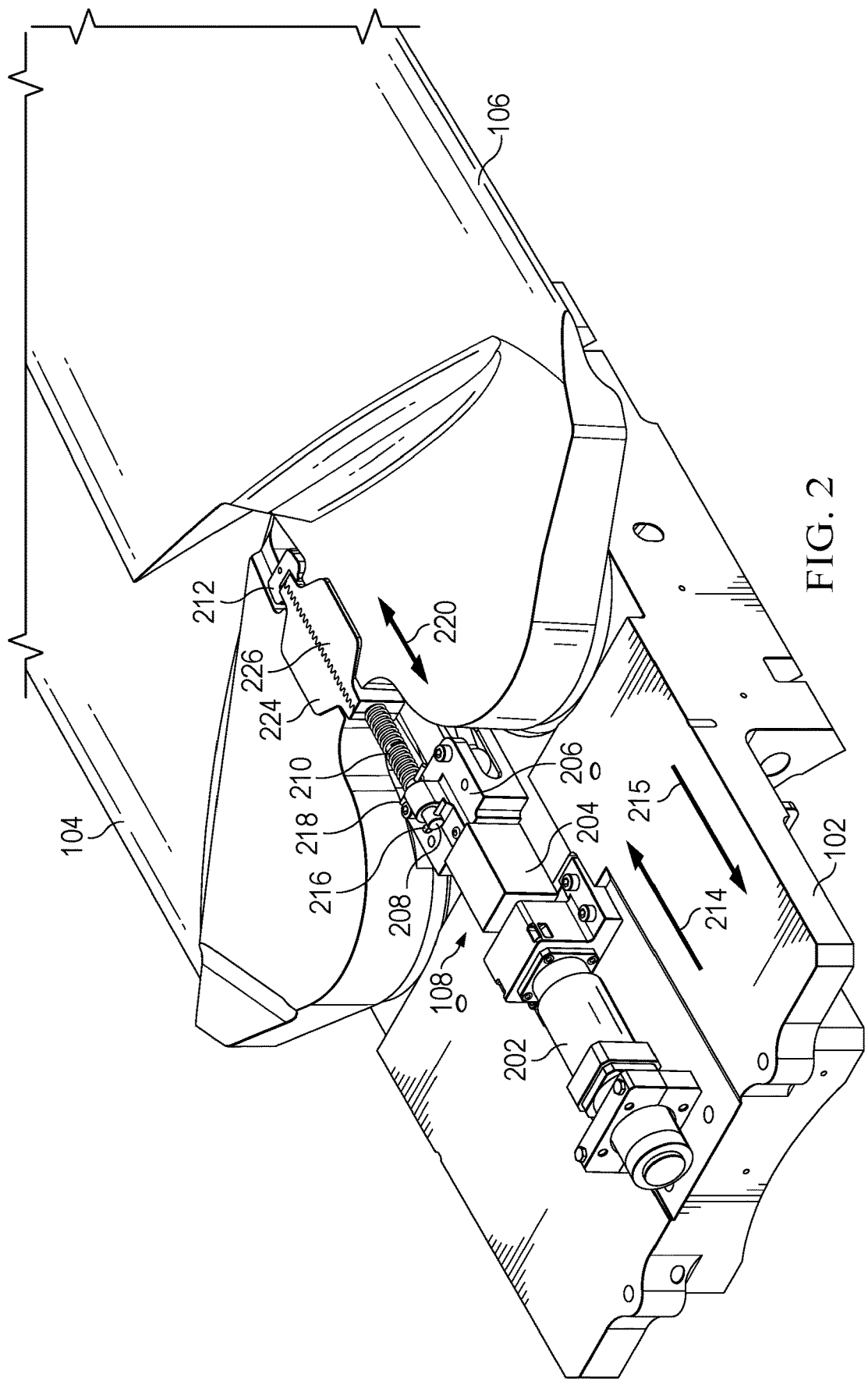
FIG. 2 is an illustration of a wing lock and deployment apparatus of an air launched vehicle in a stored position in accordance with an illustrative example.
Figure 4:
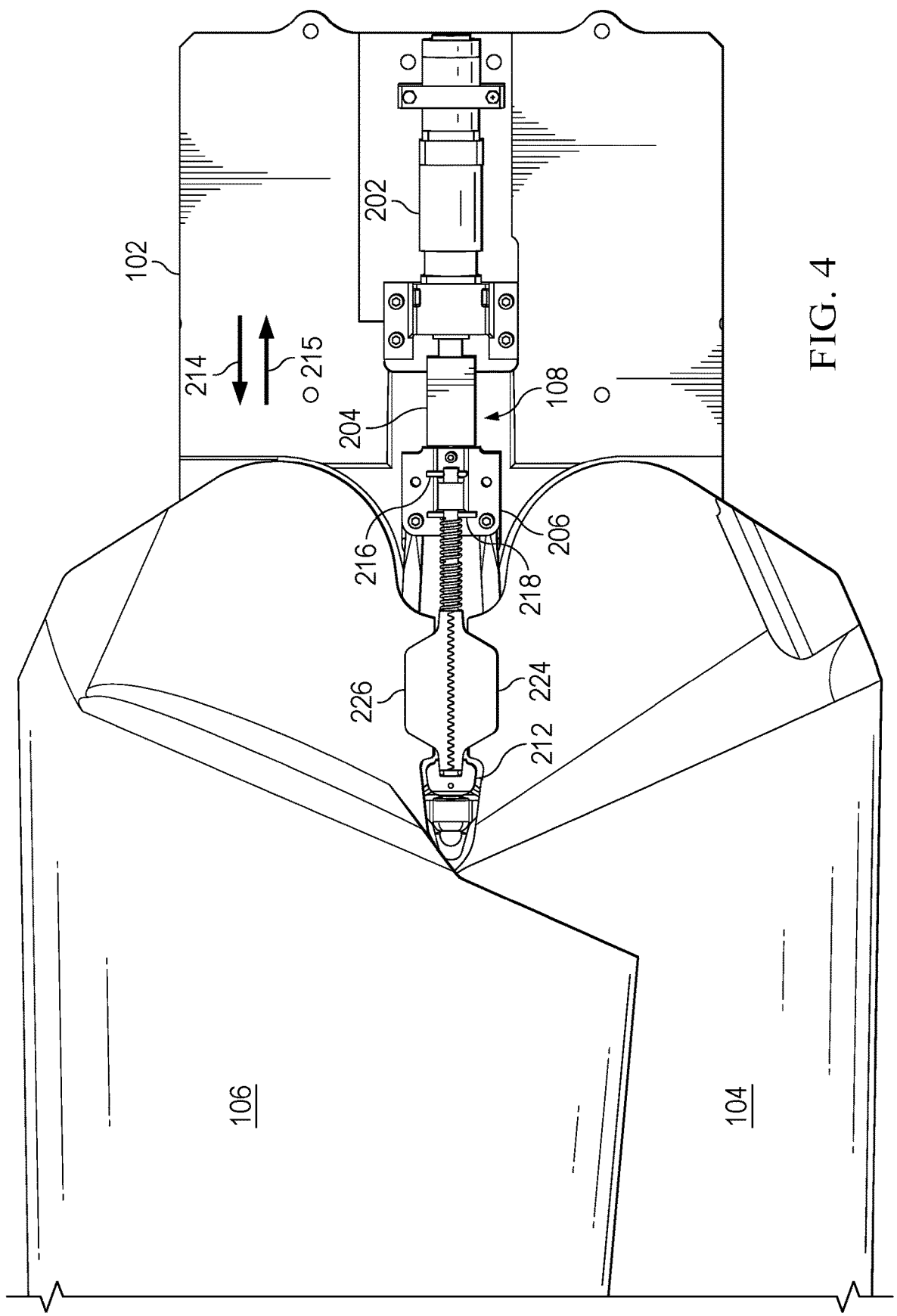
FIG. 4 is an illustration of a wing lock and deployment apparatus of an air launched vehicle in a stored position from the top in accordance with an illustrative example.

With reference next to FIGS. 2-4, illustrations of a wing lock and deployment apparatus of a glide kit for an air launched vehicle are depicted in accordance with illustrative examples.

In these illustrated examples, wing lock and deployment apparatus 108 has motor 202, ball nut 204, driver 206, lock rod 208, spring 210, and shoe clip 212.

Motor 202 is mounted to housing 102. Motor 202 provides rotational motion which wing lock and deployment apparatus 108 converts to linear motion applied to driver 206. As depicted, motor 202 rotates a ball screw (described below) which ball nut 204 which, in turn, engages driver 206 and provides linear movement of driver 206. Linear movement of driver 206 is not limited to a motor and ball nut/ball screw setup. Those skilled in the art recognize that linear motion could be imparted to driver 206 by other means including, but not limited to, for example, a linear actuator. As a result, driver 206 has a resting state before linear motion is imparted to driver 206 and a moving state as linear motion is imparted to driver 206.

As depicted, ball nut 204 is threadably engaged with ball screw 302 (FIG. 3) and ball screw 302 is mechanically engaged with motor 202. Motor 202 rotates ball screw 302. As ball screw 302 rotates, ball nut 204 moves in direction 214 along ball screw 302. Ball screw 302 passes through driver 206 without engaging driver 206. As ball nut 204 moves in direction 214, ball nut 204 engages driver 206 and imparts linear motion on driver 206 in direction 214. When ball nut 204 engages driver 206 and imparts linear motion on driver 206, driver 206 is in a moving state.

Lock rod 208 extends from driver 206 to shoe clip 212. Shoe clip 212 is mounted to end 304 of lock rod 208. Movement of lock rod 208 relative to driver 206 is fixed. Lock rod 208 may be integrally formed with driver 206 or connected to driver 206, for example, by weld, casting, or billet machining. As a result, motion in driver 206 produces motion in lock rod 208. When driver 206 moves in direction 214, lock rod 208 moves in direction 214. As depicted, pin 216 passing horizontally through lock rod 208 and pin 218 passing horizontally through lock rod 208 constrain movement of lock rod 208 relative to driver 206 in direction 214 and direction 215. Direction 215 is parallel with direction 214. Spring 210 surrounds lock rod 208 and abuts pin 218.

In the stored position, as depicted in FIGS. 2 and 4-6, lock rod 208 passes through, without engagement with, wing shoe 224 and wing shoe 226. Wing shoe 224 is connected to deployable wing 104. Wing shoe 226 is connected to deployable wing 106. A toothed edge of wing shoe 224 engages a mating toothed edge of wing shoe 226 when deployable wing 104 and deployable 106 are in the stored position as depicted in FIGS. 2 and 4-6. The engagement of the toothed edges of wing shoe 224 and wing shoe 226 prevent movement of the deployable wings relative to each other as the air launched vehicle glide kit 100 is attached to and transported by the host aircraft. While in the stored position, driver 206 is in a resting state.

Spring 210 provides bias 220. As depicted, spring 210 surrounds lock rod 208 and abuts pin 218 and abuts wing shoe 224 and wing shoe 226 such that bias 220 urges driver 206 in direction 215. The urged movement of driver 206 provided by bias 220 is not limited to the pins and spring setup depicted. Those skilled in the art recognize that bias may be imparted to driver 206 by other means including, but not limited to, for example, a biased slider joint.

As driver 206 is urged in direction 215, shoe clip mounted on end 304 of lock rod 208 is also urged in direction 215 which results in shoe clip 212 simultaneously engaging wing shoe 224 and wing shoe 226. When shoe clip 212 mounted to end 304 of lock rod 208 simultaneously engages wing shoe 224 and wing shoe 226, shoe clip 212 locks deployable wing 104 and deployable wing 106 in the stored position. Bias 220 of spring 210 keeps the wings locked in the stored position until driver 206 moves in direction 214 and disengages shoe clip 212 from engagement with wing shoe 224 and wing shoe 226. Once shoe clip 212 disengages from wing shoe 224 and wing shoe 226, the deployable wings are no longer locked in the stored position and further movement of driver 206 in direction 214 results in deployable wing 104 and deployable wing 106 rotating to the deployed position (described below).

Figure 5:
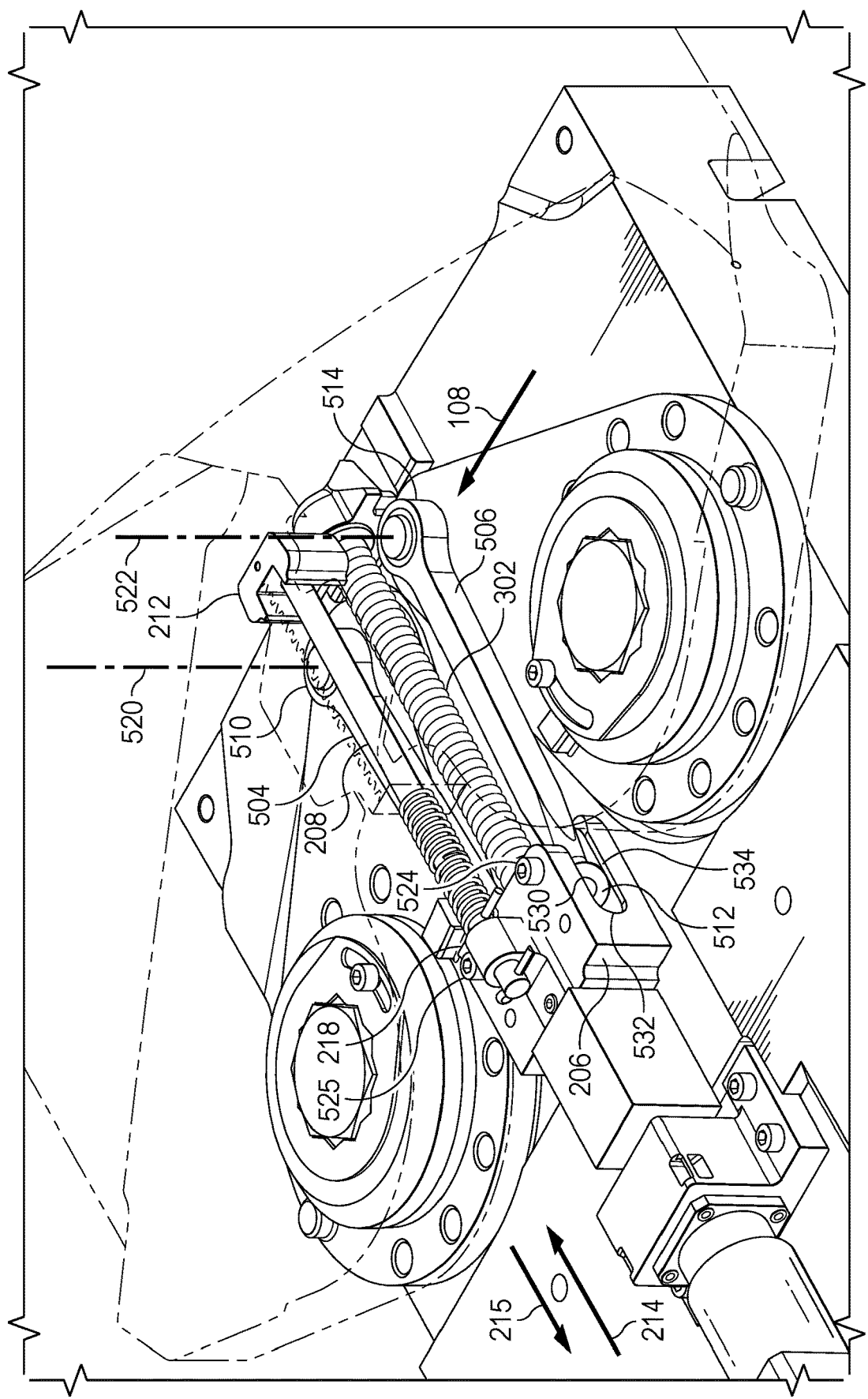
FIG. 5 is an illustration of a wing lock and deployment apparatus of an air launched vehicle in a stored position with the deployable wings in shadow in accordance with an illustrative example.
Figure 6:
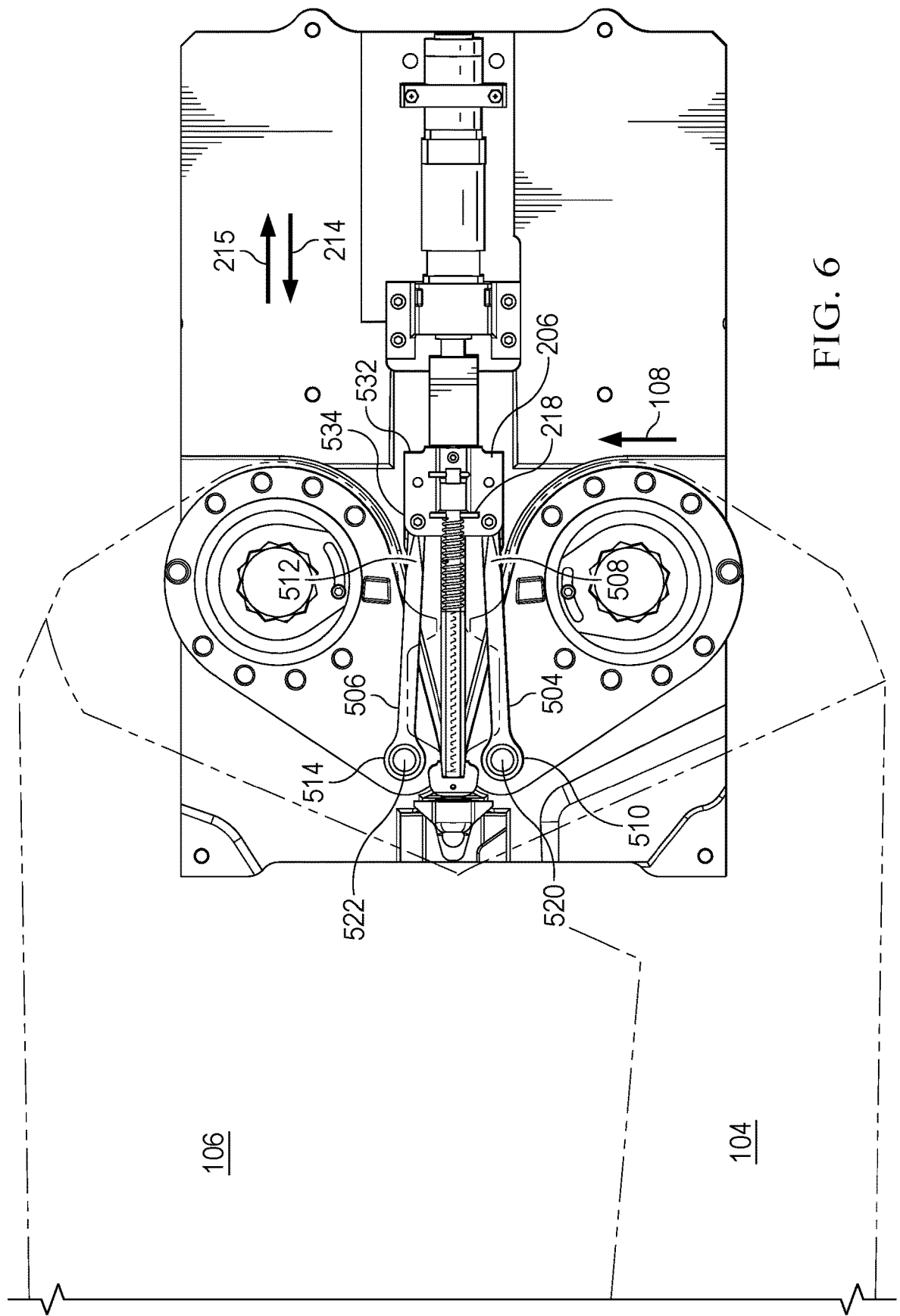
FIG. 6 is an illustration of a wing lock and deployment apparatus of an air launched vehicle in a stored position from the top with the deployable wings in shadow in accordance with an illustrative example.

With reference next to FIGS. 5-6, illustrations of a wing lock and deployment apparatus of a glide kit for an air launched vehicle where deployable wings of the glide kit are shown in shadow are depicted in accordance with an illustrative example.

In these illustrated examples, wing lock and deployment apparatus 108 further includes linkage 504 and linkage 506. Linkage 504 is rod-shaped and includes end 508 opposite end 510. Linkage 506 is rod-shaped and includes end 512 opposite end 514. End 510 of linkage 504 is pivotally connected to deployable wing 104 at axis 520. Axis 520 is generally perpendicular to direction 214 and direction 215. End 514 of linkage 506 is pivotally connected to deployable wing 106 at axis 522. Axis 522 is generally perpendicular to direction 214 and direction 215.

End 508 of linkage 504 and end 512 of linkage 506 are both ball-shaped. End 508 and end 512 are pivotable with respect to driver 206. End 512 is slidable within slot 530. Slot 530 is formed in driver 206. Slot 530 is cylindrical shaped. Thus end 512 can pivot within slot 530 and slide through the length of slot 530 from end 532 of slot 530 to end 534 of slot 530. Although not visible, another slot formed on the opposite side of driver 206 engages end 508 of linkage 504 in an identical manner. Slot 530 and the other slot formed on the opposite side of the driver are generally parallel. Pin 524 engages driver 206. Pin 524 extends through driver 206 and into slot 530. Pin 524 prevents end 512 of linkage 506 from exiting end 534 of slot 530 formed in driver 206. Pin 525 is similar to pin 524 and provides the same function with regard to the slot formed on the opposite side of driver 206.

When in the stored position and shoe clip 212 simultaneously engaged with wing shoe 224 and wing shoe 226 such that the deployable wings are locked in the stored position, end 512 of linkage 506 is positioned near end 534 of slot 530. End 508 of linkage 504 is correspondingly positioned in the same manner in the slot on the opposite side of driver 206.

Upon receiving a single command to unlock and deploy the deployable wings, wing lock and deployment apparatus 108 imparts linear movement to driver 206. Driver 206 linearly moves in direction 214 against bias 220 of spring 210. As driver 206 moves in direction 214, lock rod 208 pushes shoe clip 212 out of engagement with wing shoe 224 and wing shoe 226 thus unlocking the deployable wings. Simultaneously, end 512 slides through slot 530 from end 534 to end 532. End 508 moves in an identical manner through its respective slot in driver 206. End 512 and end 508 slide through the length of their respective slots until they reach the end of their respective slots resulting in shoe clip 212 disengaging from wing shoe 224 and wing shoe 226. The deployable wings are effectively "unlocked" and ready for deployment. While end 512 and end 508 are moving through the length of their respective slots, linkage 504 and linkage 506 do not move with respect to housing 102 or the deployable wings.

Once the deployable wings are unlocked, as driver 206 moves further in direction 214, the movement of driver 206 pushes linkage 504 and linkage 506. The movement of linkage 504 and linkage 506 combined with the pivotal engagement of linkage 504 with driver 206 and deployable wing 104 as well as the pivotal engagement of linkage 506 with driver 206 and deployable wing 106 forces the deployable wings to rotate about axes 520 and 522 to deploy to the deployed position depicted in FIG. 3.

A stop on each deployable wing 104 and deployable wing 106 prevents rotation of the deployable wings past the deployed position. Once the wings are in the deployed position, their respective angles with respect to housing 102 and the wind resistance each are inherently experiencing during use locks the deployable wings in the deployed position. Further, the geometry of the linkages, once the deployable wings are in the deployed position, prevents the driver from movement in direction 215 thus locking the deployable wings in the deployed position.

Figure 7:
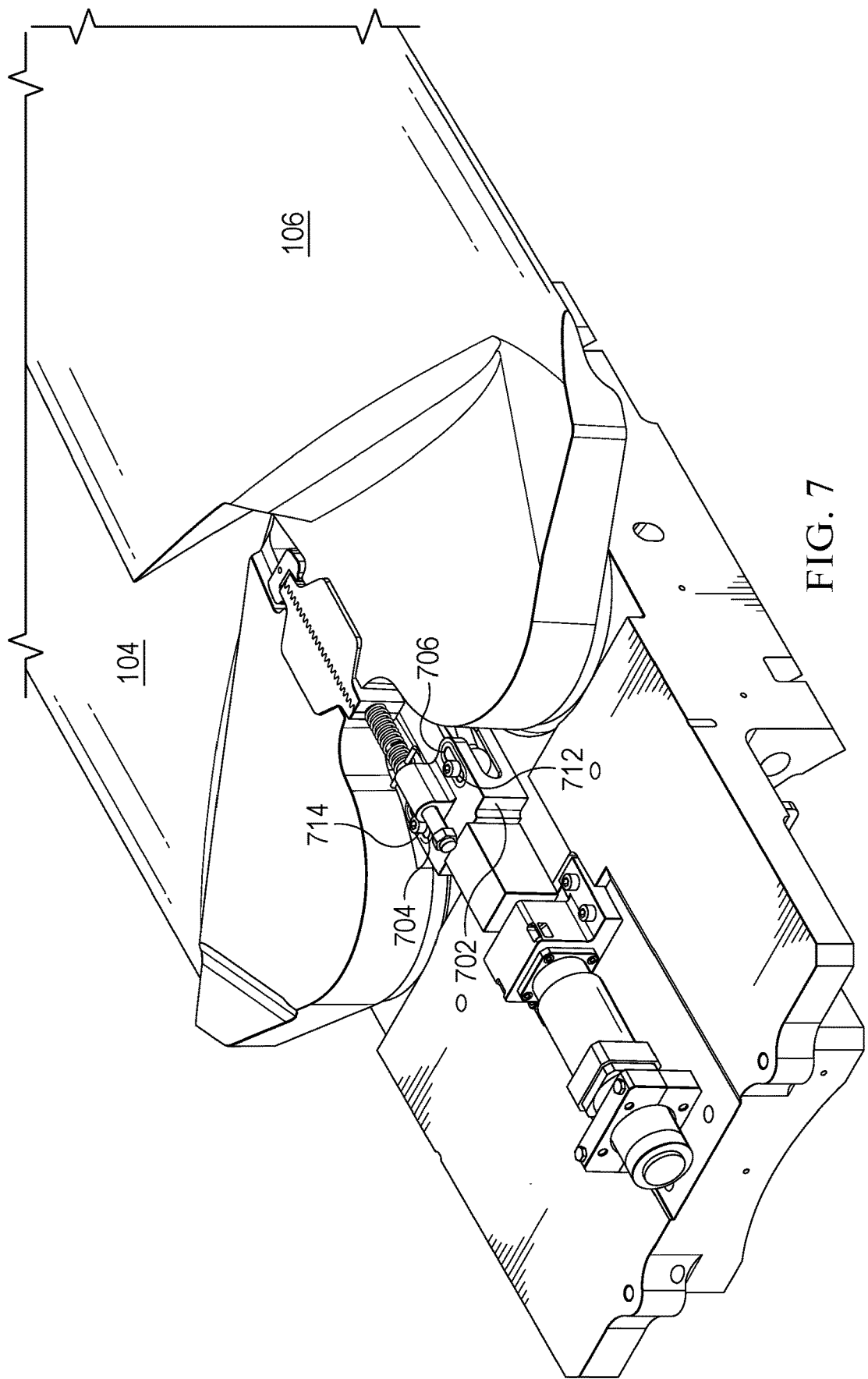
FIG. 7 is an illustration of a wing lock and deployment apparatus of an air launched vehicle in a stored position from the top in accordance with an illustrative example.
Figure 8:
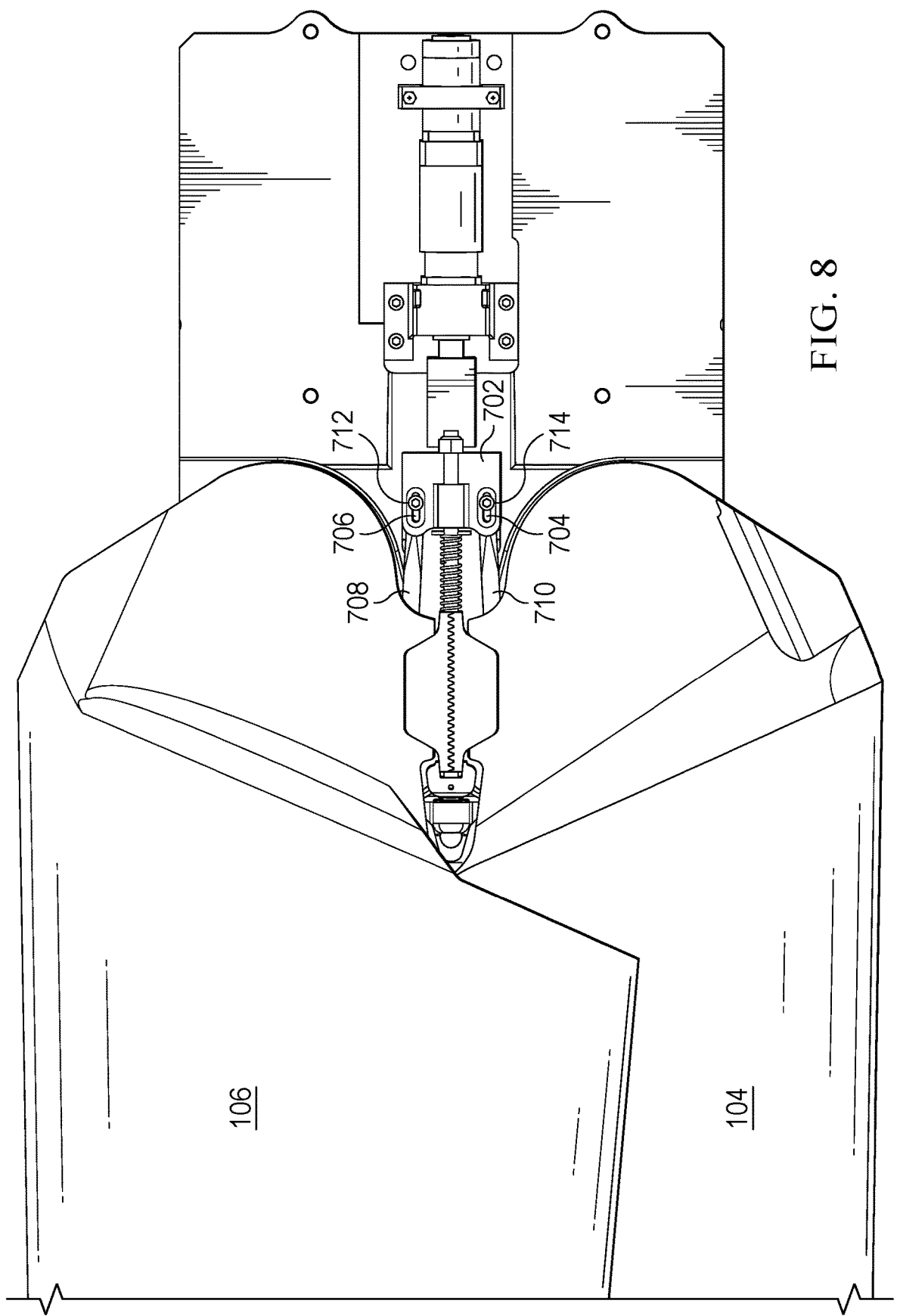
FIG. 8 is an illustration of a wing lock and deployment apparatus of an air launched vehicle in a stored position in accordance with an illustrative example.

With reference next to FIGS. 7-8, an illustration of components of a wing lock and deployment apparatus is depicted in accordance with an illustrative example. In the illustrative examples, the same reference numeral may be used in more than one figure. This reuse of a reference numeral in different figures represents the same element in the different figures.

Driver 702 further includes slot 704 and slot 706. Linkage 708 is pivotally attached to driver 702 with fastener 712. Linkage 710 is pivotally attached to driver 702 with fastener 714. The operation of the linkages sliding through respective slots in the driver operates in a similar manner. However, here, fastener 712 also slides through the length of slot 706 and fastener 714 slides through the length of slot 704 at the same time as the linkages slide through the length of their respective slots.

Figure 9:
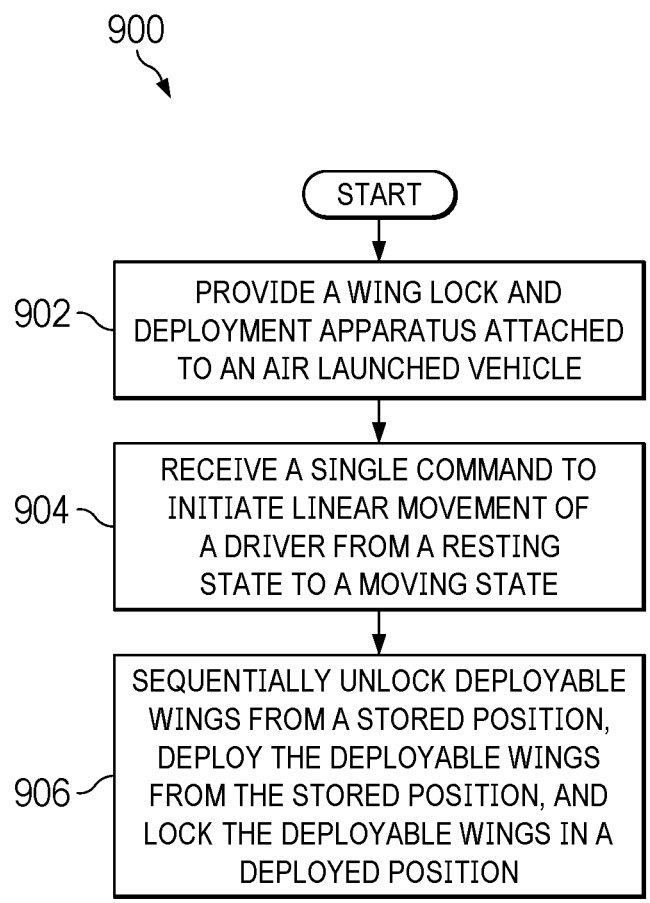
FIG. 9 is an illustration of a flowchart of a process for unlocking and deploying wings of an air launched vehicle in accordance with an illustrative embodiment.

With reference next to FIG. 9, an illustration of a flowchart of a process 900 for unlocking and deploying wings of an air launched vehicle is depicted in accordance with an illustrative embodiment. The method depicted in FIG. 9 may be used in conjunction with the wing lock and deployment apparatus depicted in FIGS. 1-8.

The process begins by providing a wing lock and deployment apparatus for attachment to an air launched vehicle (operation 902). The wing lock and deployment apparatus may include features and structure as depicted in FIGS. 1-8. The process receives a single command to initiate linear movement of a driver of the wing lock and deployment apparatus from a resting state to a moving state (operation 904). When the driver is in the resting state, a bias on the driver forces a shoe clip of the driver into engagement with deployable wings to put the wing lock and deployment apparatus in a locked position. When the driver is in the moving state, the driver overcomes the bias to disengage the shoe clip from engagement with deployable wings. Further while the driver in in the moving state, rod-shaped linkages that are pivotally connected to the deployable wings move from a first end of a slot in the driver through a length of the slot to a second end of the slot in the driver as the shoe clip of the driver disengages from the deployable wings. When the linkages are positioned in the second end of the slot and the shoe clip is disengaged from the deployable wings, the linkages force rotation of the deployable wings from a stored position to a deployed position. At operation 906, as a result of the linear movement of the driver, the process sequentially unlocks the deployable wings from a stored position, deploys the deployable wings from the stored position, and locks the deployable wings in a deployed position.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
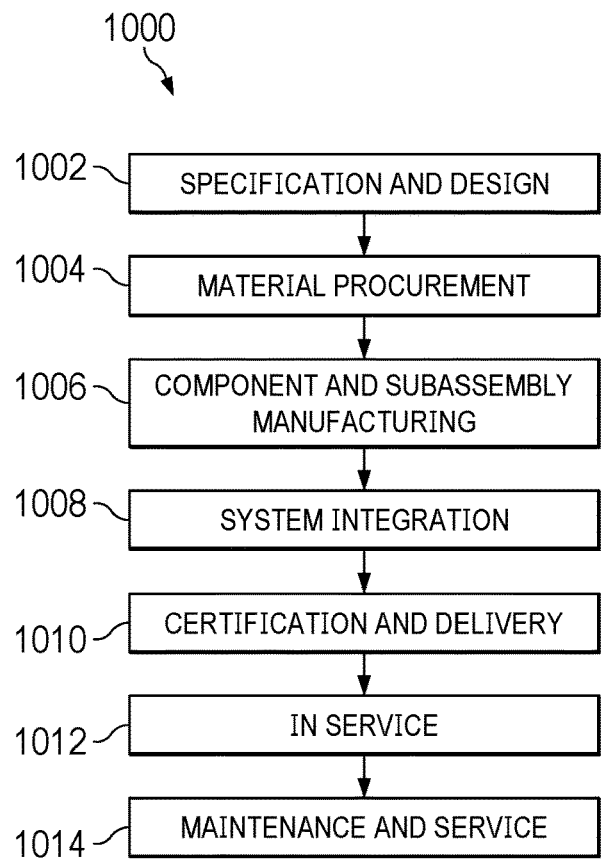
FIG. 10 is an illustration of a block diagram of an aircraft manufacturing and service method in accordance with an illustrative embodiment.
Figure 11:
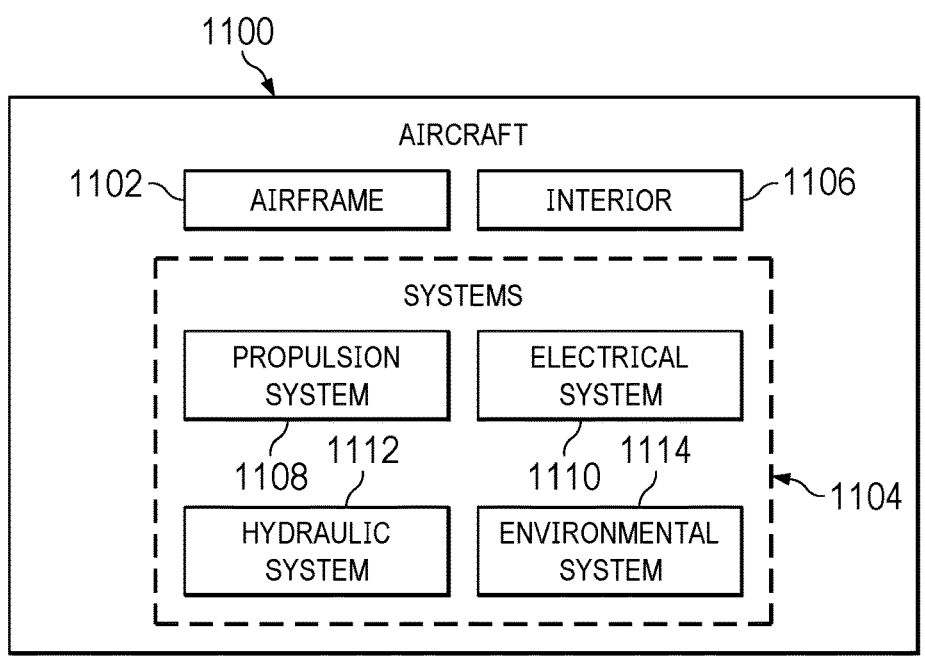
FIG. 11 is an illustration of a block diagram of an aircraft in which an illustrative embodiment may be implemented.

The illustrative embodiments of the disclosure may be further described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004. Aircraft 1100 in FIG. 11 may be an air launched vehicle or a host aircraft as previously described.

During production, component and subassembly manufacturing 1006 and system integration 1008 of aircraft 1100 in FIG. 11 takes place. Thereafter, aircraft 1100 in FIG. 11 may go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of a block diagram of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10. In one illustrative example, components or subassemblies produced in component and subassembly manufacturing 1006 in FIG. 10 may be fabricated or manufactured in a manner similar to components or subassemblies produced while aircraft 1100 is in service 1012 in FIG. 10. As yet another example, one or more apparatus embodiments, method embodiments, or a combination thereof may be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

The illustrative examples eliminate the need for three separate mechanisms with their own actuators and mechanism inputs and instead accomplishes all three tasks of unlocking deployable wings of an air launched vehicle, deploying deployable wings of an air launched vehicle from a stored position, and locking deployable wings of an air launched vehicle in a deployed position with one single linear actuation event.

The single command received by the disclosed wing lock and deployment apparatus causes the single linear actuation event which accomplishes all three tasks in sequential order.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A wing lock and deployment apparatus, comprising:
a driver configured to be moved linearly;
a slot formed in the driver;
a linkage comprising a first end and a second end, the first end of the linkage pivotably connected to the driver and slidable within the slot, the second end of the linkage pivotably connected to a deployable wing;
a lock rod engaged with the driver;
a shoe clip mounted to the lock rod and shaped to engage the deployable wing; and
a bias on the lock rod, the bias configured to force the shoe clip into engagement with the deployable wing.

2. The apparatus of claim 1 further comprising a pin engaged with the lock rod.

3. The apparatus of claim 2, wherein the bias is a spring surrounding the lock rod, the spring in contact with the pin and the deployable wing.

4. The apparatus of claim 2, wherein the driver has a resting state and a moving state, wherein when the driver is in the resting state the first end of the linkage is positioned in a first end of the slot and wherein when the driver is in the moving state the first end of the linkage is not positioned in the first end of the slot.

5. The apparatus of claim 4, wherein when the driver is in the resting state, the bias forces the shoe clip into engagement with the deployable wing and the apparatus is in a locked position.

6. The apparatus of claim 1, wherein the driver is moved linearly by a ball screw or a linear actuator.

7. The apparatus of claim 1, wherein the deployable wing comprises a pair of deployable wings and each deployable wing of the pair of deployable wings comprises a wing shoe, and wherein each wing shoe of the respective pair of deployable wings has a toothed surface for engagement with each other.

8. A wing lock and deployment system for storing, unlocking, and deploying wings of an air launched vehicle, comprising:
a glide kit attached to the air launched vehicle, the glide kit comprising a stored position and a deployed position; and
a linear motion source engaged with the glide kit; the glide kit comprising:
a first deployable wing and a second deployable wing;
a first linkage pivotably attached to the first deployable wing and a second linkage pivotably attached to the second deployable wing;
a driver configured to be moved linearly by the linear motion source;
a first slot formed in the driver and a second slot formed in the driver, the first slot parallel with the second slot;
the first linkage pivotable with respect to the driver and slidable along the first slot;
the second linkage pivotable with respect to the driver and slidable along the second slot;
a lock rod engaged with the driver;
a shoe clip mounted to the lock rod and shaped to engage the first deployable wing and the second deployable wing when the first deployable wing is coupled to the second deployable wing; and
a bias on the lock rod, the bias configured to force the shoe clip into engagement with the first deployable wing and the second deployable wing.

9. The system of claim 8, wherein linear movement of the driver unlocks the glide kit from a locked position and deploys the first deployable wing and the second deployable wing to the deployed position.

10. The system of claim 9, wherein the system unlocks the glide kit from the locked position and deploys the first deployable wing and the second deployable wing to the deployed position with a single command.

11. The system of claim 8, wherein the glide kit further comprises a pin engaged with the lock rod.

12. The system of claim 11, wherein the bias is a spring surrounding the lock rod and when the glide kit is in a locked position, the spring is in contact with the pin, the first deployable wing, and the second deployable wing when the first deployable wing is coupled to the second deployable wing.

13. The system of claim 11, wherein the driver has a resting state and a moving state, wherein when the driver is in the resting state the first linkage is positioned in a first end of the first slot and the second linkage is positioned in a first end of the second slot, and wherein when the driver is in the moving state the first linkage is not positioned in the first end of the first slot and the second linkage is not positioned in the first end of the second slot.

14. The system of claim 13, wherein when the driver is in the resting state, the bias forces the shoe clip into engagement with the first deployable wing and the second deployable wing when the first deployable wing is coupled to the second deployable wing and the glide kit is in the stored position.

15. The system of claim 13, wherein when the driver is in the moving state, the driver contacts the pin and overcomes the bias on the lock rod to disengage the shoe clip from engagement with the first deployable wing and the second deployable wing.

16. A method for unlocking and deploying wings of an air launched vehicle, the method comprising:
providing a wing lock and deployment apparatus attached to an air launched vehicle, wherein the wing lock and deployment apparatus comprises:
deployable wings;
linkages pivotally connected to the deployable wings; and
a driver connected to the deployable wings, wherein:
the driver comprises a slot and a shoe clip and is configured to move linearly; and
the linkages are configured to move from a first end of the slot in the driver through a length of the slot to a second end of the slot in the driver as the shoe clip of the driver disengages from the deployable wings;
receiving a single command to initiate linear movement of the driver from a resting state to a moving state; and
as a result of the linear movement of the driver, sequentially unlocking the deployable wings, deploying the deployable wings from a stored position, and locking the deployable wings in a deployed position.

17. The method of claim 16, wherein when the driver is in the resting state, a bias on the driver forces a shoe clip of the driver into engagement with the deployable wings to lock the deployable wings in the stored position.

18. The method of claim 17, wherein when the driver is in the moving state, the driver overcomes the bias to disengage the shoe clip from engagement with deployable wings.

19. The method of claim 16, further comprising moving the driver with a ball screw or a linear actuator.

20. The method of claim 16, wherein when the linkages are positioned in the second end of the slot and the shoe clip is disengaged from the deployable wings, the linkages force rotation of the deployable wings from the stored position to the deployed position.

\* \* \* \* \*